(12) United States Patent
Enderle et al.

(10) Patent No.: US 12,485,374 B2
(45) Date of Patent: Dec. 2, 2025

(54) AIR FILTER DEVICE AND FILTER ELEMENT FOR AN AIR FILTER DEVICE OF A MOTOR VEHICLE

(71) Applicant: Mercedes-Benz Group AG, Stuttgart (DE)

(72) Inventors: Wolfgang Enderle, Hochdorf (DE); Eric Schumacher, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 545 days.

(21) Appl. No.: 17/920,573

(22) PCT Filed: Apr. 14, 2021

(86) PCT No.: PCT/EP2021/059710
§ 371 (c)(1),
(2) Date: Oct. 21, 2022

(87) PCT Pub. No.: WO2021/213869
PCT Pub. Date: Oct. 28, 2021

(65) Prior Publication Data
US 2023/0158432 A1 May 25, 2023

(30) Foreign Application Priority Data
Apr. 22, 2020 (DE) .................. 10 2020 110 996.2

(51) Int. Cl.
*B01D 46/00* (2022.01)
*B01D 46/52* (2006.01)
(Continued)

(52) U.S. Cl.
CPC ....... *B01D 46/0005* (2013.01); *B01D 46/521* (2013.01); *B60H 3/0616* (2013.01);
(Continued)

(58) Field of Classification Search
CPC .............. B01D 46/0005; B01D 46/521; B01D 2265/025; B01D 2265/028; B01D 46/10;
(Continued)

(56) References Cited

U.S. PATENT DOCUMENTS 6,267,793 B1 * 7/2001 Gomez .................. B01D 46/42
55/504
6,284,011 B1 * 9/2001 Chiang .................. F24F 13/28
55/504
(Continued)

FOREIGN PATENT DOCUMENTS

CN 107002598 A 8/2017
CN 108928218 A 12/2018
(Continued)

OTHER PUBLICATIONS

Korean-language Korean Office Action issued in Korean Application No. 10-2022-7003272 dated Jul. 22, 2024, with English translation (8 pages).
(Continued)

*Primary Examiner* — T. Bennett Mckenzie
(74) *Attorney, Agent, or Firm* — Crowell & Moring LLP (57) ABSTRACT

An air filter device for a motor vehicle includes a housing with a receiving space for a filter element where the filter element has a respective first projection that projects from each side wall near one of two transverse walls. The housing has two opposite housing side walls, both of which have at least one link each in which the first projection of the respective side wall of the filter element is insertable in a first link end region directed in a first direction. A respective second projection projects from the side walls near the other one of the two transverse walls and the housing side walls each have a second link end region directed opposite to the first direction into which the second projections are insert-
(Continued)

able such that the filter element is located in an operating position in the receiving space of the housing.

4 Claims, 6 Drawing Sheets

(51) Int. Cl.
  *B60H 3/06* (2006.01)
  *F02M 35/024* (2006.01)
(52) U.S. Cl.
  CPC .. *F02M 35/02416* (2013.01); *F02M 35/0245* (2013.01); *F02M 35/02491* (2013.01); *B01D 2265/025* (2013.01); *B01D 2265/028* (2013.01); *B60H 2003/065* (2013.01)
(58) Field of Classification Search
  CPC .. B01D 46/0002; B01D 46/52; B60H 3/0616; B60H 2003/065; B60H 3/0658; F02M 35/02416; F02M 35/0245; F02M 35/02491; F24C 15/10; F24C 15/2042
  USPC .......................................................... 55/497
  See application file for complete search history.

(56) References Cited

U.S. PATENT DOCUMENTS

| | | | |
|---|---|---|---|
| 6,485,538 B1 | 11/2002 | Toyoshima | |
| 6,585,792 B2* | 7/2003 | Schneider | B01D 46/0005 55/385.2 |
| 7,312,990 B2* | 12/2007 | Mangold | H05K 13/0069 361/720 |
| 7,828,867 B2* | 11/2010 | Fox | F24F 13/28 55/497 |
| 8,613,785 B1* | 12/2013 | Davis | B01D 46/4227 55/497 |
| 2008/0202451 A1* | 8/2008 | Taniuchi | E02F 9/00 123/41.15 |
| 2009/0064647 A1* | 3/2009 | Darnell | B01D 46/521 55/499 |
| 2009/0209190 A1* | 8/2009 | Gould | B60H 3/0658 55/495 |
| 2010/0050581 A1* | 3/2010 | Schuld | B01D 46/0016 493/405 |
| 2010/0313534 A1* | 12/2010 | Kinney | B01D 46/0002 55/501 |
| 2012/0124947 A1* | 5/2012 | Dewit | B01D 46/62 55/357 |
| 2015/0345438 A1* | 12/2015 | Finn | F02M 35/0203 55/501 |
| 2016/0230716 A1* | 8/2016 | Finn | F02M 35/0201 |
| 2016/0280045 A1* | 9/2016 | Nefzer | B01D 46/0005 |
| 2018/0050296 A1* | 2/2018 | Fritzsching | B01D 46/2414 |
| 2020/0072169 A1* | 3/2020 | Ehrenberg | F02M 35/02433 |
| 2020/0269174 A1* | 8/2020 | Schumacher | B01D 46/521 |

FOREIGN PATENT DOCUMENTS

| | | |
|---|---|---|
| DE | 2342567 A1 | 8/1973 |
| DE | 10 2007 048 395 A1 | 4/2009 |
| DE | 10 2007 048 396 A1 | 4/2009 |
| DE | 10 2013 020 382 A1 | 6/2015 |
| DE | 10 2014 004 738 A1 | 10/2015 |
| GB | 1 446 195 A | 8/1976 |
| WO | WO-2018175950 A1 * | 9/2018 ......... B01D 46/0005 |

OTHER PUBLICATIONS

Chinese-language Chinese Office Action issued in Chinese application No. 202180005542.6 dated Mar. 22, 2023 (Six (6) pages).
PCT/EP2021/059710, International Search Report dated May 14, 2021 (Two (2) pages).
German-language German Office Action issued in German application No. 10 2020 110 996.2 dated Dec. 3, 2020 (Seven (7) pages).
U.S. Patent Application, "Filter Element for an Air Filter Device of a Motor Vehicle, and Air Filter Device", filed Oct. 21, 2022, Inventor Eric Schumacher.
U.S. Patent Application, "Filter Element for an Air Filtration Device of a Motor Vehicle and Air Filtration Device", filed Oct. 21, 2022, Inventor Eric Schumacher.

* cited by examiner

AIR FILTER DEVICE AND FILTER ELEMENT FOR AN AIR FILTER DEVICE OF A MOTOR VEHICLE

BACKGROUND AND SUMMARY OF THE INVENTION

The invention relates to an air filter device with a filter housing for receiving a replaceable filter element for an air filter device of a motor vehicle, wherein the filter housing has links for guiding and supporting projections on two opposite side walls of the flat filter element, which consists of a filter fleece, which is held in a frame that forms the side walls. The invention further relates to a filter element with projections on the side walls for the air filter device of a motor vehicle.

So that a filter element in a housing of an air filter device for a motor vehicle can fulfil its function reliably, it is necessary to ensure that the filter element is fixed in the housing in such a way that it is sealed and positionally stable.

DE 10 2014 004 738 A1 describes a filter element with a box-shaped body, wherein, in a frame wall of the body formed from flexible material, in contrast stiffened guide elements are formed, which serve for securing the filter element on guide bars on the housing side.

DE 10 2007 048 396 A1 and DE 10 2007 048 395 A1 each describe a filter element for an air conditioning system of a motor vehicle. The filter element has end faces opposite one another, which are made of paper material or plastic material. Two peg-shaped guide elements project perpendicularly from each end face. In order to bring the filter element into its working position, the guide elements are moved along guide grooves, which are formed in a housing of the air conditioning system. In this air conditioning system, two such filter elements are to be arranged next to one another in the flow cross-section of the housing. The entire movement of the filter elements during assembly and dismantling takes place entirely in a plane defined by the guide grooves, perpendicular to the direction of flow. After inserting the second filter element in the housing, the opening in the housing surrounding the flow cross-section, which is provided for inserting the filter elements, is closed by means of a cover. In the cover, a further guide groove is formed, into which the guide elements of the second internal filter are inserted when fitting the edge cover on the housing. Thus, in this configuration, the cover interacts with and supports correct positioning and holding of the filter elements.

If, however, the filter element is inserted in a frame cross-section of the air filter device closed all round on the housing side, relative to the flow cross-section, for example in a hinged air scoop or an end of an air duct, the assembly/dismantling of the filter element cannot take place in the same plane in which the filter element assumes its operating position. Rather, the filter element must be displaced in—or against—the direction of flow into the plane of its final operating position.

In an air filter device in which the filter element is inserted in a closed housing cross-section like this, a holder of the filter element may be provided, in which case the filter element, in the operating position, is to rest on projections on the housing side. These projections are configured for example in the receiving housing frame as small, inward-projecting projections or brackets on opposite housing walls of the housing.

To insert the filter element, the frame of the filter element must first be compressed inwards a little, in order to be able to place the filter element past the projections, which make the housing cross-section narrower, on the projections carrying them, as soon as it springs back to the original shape. It may happen that a wall of the filter frame does not come to rest correctly on the carrying projections, but is merely pressed against the projections. In particular, in the region of the housing of the air filter device, in which the projections are not easy to see, this may remain unnoticed. In this way, undesirable and moreover not easily discernible leakage of the air filter device may occur.

DE 10 2013 020 382 A1 describes a filter element with frame for securing in a filter air scoop or in an all-round closed cross-section of an air filter housing. At one end—pointing in the insertion direction of the frame—of two opposite side walls, sideways-projecting contact elements are arranged—transversely to the insertion direction. The contact elements are introduced into sliding block guides on the housing side. In the final position of the contact elements in the sliding block guides, the filter element can be swivelled about the resultant swivel axis, in order to insert it fully in the surrounding housing. On the end face of the frame of the filter element, which is opposite the rear wall near the swivel axis, two elastic snap-in hooks are mounted. The snap-in hooks lock, by swivelling-in the filter element, with respective locking elements, which are formed on the filter housing.

The object of the present invention is to provide an improved air filter device of the kind stated at the beginning, with which the filter element can be mounted particularly easily in its predetermined installation position in the filter housing, and an improved filter element for mounting in the corresponding air filter device.

The air filter device according to the invention—also called "air filter housing" or "housing" hereinafter—for a motor vehicle comprises a housing with a receiving space for a filter element according to the invention. The filter element has a frame, which surrounds a filter material at least partially, wherein the frame comprises two opposite side walls as well as opposite transverse walls, which join the side walls together. In each case a first projection projects from each side wall near the same transverse wall.

The housing has—corresponding to the frame of the filter element—two opposite housing side walls. The two housing side walls each have at least one link, in which the respective first projection of the relevant or corresponding side wall of the filter element can be inserted in each case in a first link end region intended for it, which is attainable along a first direction of the link.

According to the invention, it is provided that in each case a second projection projects from the side walls of the filter element near the other one of the two transverse walls, and the housing side walls in each case have a second link end region—directed against the first direction—in which in each case the second projections can be inserted, so that the filter element is then located in its operating position in the receiving space of the housing, wherein the side walls are elastically deformable, so that a distance of the two projections arranged on the same side wall from one another can be reduced, in order to bring the second projections during insertion past inwards-directed link guide flanks into the second end region assigned or intended for them in each case.

If the first projections have reached their respective link end region in the housing side walls opposite one another, in this position the filter element can be swivelled about the rotation axis formed by these projections.

Next, the two still free—or second—projections of the housing walls opposite one another can be brought into the second link end regions assigned to them, by compressing the side walls of the filter element towards the first projections, for example by pressing on the transverse wall of the filter element nearer the second projections—and still freely accessible. This in each case reduces the distance of the first and second projections from one another, wherein the projections are led along the link guide flanks on the housing side, and at the end of the movement the filter element is raised to the level of the receiving space, where the second projections occupy the link end regions assigned to them as the side walls spring back into their undeformed initial state. The filter element is then held positionally secured in its installation position. The air filter device described and the associated filter element allow assembly of the filter element in a very simply executed, reliable process, with quick and reliable assembly of the filter element being ensured by the controllable and logical movements during installation. With the proposed design of air filter device and filter element, front locking mechanisms are no longer required on the filter element, so there may also be a saving of space.

In the link end regions, the projections on the side walls of the filter element are secured in a final position against unintentional moving out or falling out from the link, because for removal or dismantling of the filter element, the filter element must be deformed again. In order to be able to remove the filter element from the housing, the respective projection is for example moved out of its final position by a manual operation on the filter material connected to the walls of the filter element either along the link or orthogonally thereto—towards the centre axis of the filter element—, while deforming at least the corresponding side wall. Without deformation of the side wall, the projections cannot in any case be moved out of the link. Therefore the filter element is also securely fitted in the receiving space if the projections are located in the respective final position or in the link end regions.

The air filter device may in particular be configured as an air filter device of an air conditioning system or a ventilation device of the motor vehicle. Moreover, the air filter device may be intended for an intake tract of a combustion engine of the motor vehicle, i.e., as a filter for the air drawn in by a combustion engine.

Preferably the at least one link of the respective housing side wall has a guide spacer, along which the first projection of the in each case corresponding side wall of the filter element can be led into the first end region of the link when inserting the filter element in the receiving space, wherein the guide spacer extends along a bottom edge of the respective housing side wall.

The bilateral links provided with a guide spacer at the bottom provide convenient and secure assembly of the filter element in the housing of the air filter device. With these splinted link segments, with which a guide for the projections is present both upwards and downwards, the first projections can be led reliably into their respective link end regions even when the view is poor or obstructed.

Alternatively it may be provided that both the first housing wall and the second housing wall each have two links, which have guide flanks opposite one another, in the direction of the distance of the projections arranged on the associated side wall of the filter element, and extending obliquely to one another.

In this embodiment, for assembling the filter element firstly—optionally—two opposite projections of the filter element may first be inserted in the links or link end regions intended for them, so that again a swivel axis is provided parallel to the corresponding transverse side, so that the filter element can be held on the other, free transverse side, and then the two lateral projections that are still free reach the associated link end regions along the associated link guide flanks—once again by pressing in the direction of the projections inserted first, by reducing the distance from them and by lifting; and therefore the filter element also reaches the operating position. However, the filter element may also simply be pushed into the receiving space of the housing vertically from below. In this way, a very simple and reliable assembly process is attainable in the form of introducing the filter element into the receiving space.

Preferably the link end regions of both links of the respective housing wall connect directly to the respective link guide flanks, wherein the link end regions extend in different directions.

Owing to the direct vicinity of the end regions to the guide flanks, particularly easy assembly—as well as dismantling—of the filter element is achievable, as this only requires a comparatively slight compression of the side walls to reduce the distance between the projections that are to be supported in the end regions of the links. Owing to the divergent directions of the link end regions, the projections—again diverging after compression of the side walls—are advantageously located spontaneously in the position intended for them for holding the filter element in the operating position.

The filter element according to the invention for the air filter device according to the invention of a motor vehicle described above comprises a frame, which surrounds a filter material of the filter element at least partially, wherein the frame has a first side wall and an opposite second side wall, and a first and an opposite second, transverse wall connecting the side walls. Both on the first side wall and on the second side wall, in each case two projections are arranged for holding the filter element to be inserted in the receiving space of the housing of the air filter device in link end regions of corresponding or assigned housing side walls—thus in each case those that are adjacent to the installed filter element of the filter side wall. The two projections project from the respective side wall.

According to the invention, it is provided that a distance of the two projections, each arranged on a side wall, corresponds in an undeformed state of the side walls to a distance of the link end regions intended for or assigned to them on the housing side in the corresponding housing side wall, wherein the side walls are configured to be elastically deformable, so that on the basis of elastic deformation of the respective side wall, a distance between the two projections, each arranged on a side wall, can be reduced.

A filter element of this kind can be brought easily and reliably into a predetermined installation position, in that firstly two projections of opposite side walls are inserted in the link end regions assigned to them on the housing side, which are formed in opposite housing side walls of the housing of the air filter device, so that a swivel axis is provided parallel to the nearest transverse wall of the filter element. Then the two projections that are still free on the housing walls opposite one another along the link guide flanks on the housing side are brought into the second link end regions intended for or assigned to them, by compressing the side walls of the filter element by pressing on the transverse wall of the filter nearer the second projections towards the first projections, so that in each case the distance between the first and second projections is reduced. When the side walls spring back to their undeformed initial state, so that the second projections occupy the link end regions assigned to or intended for them, the filter element can be held positionally secured in its installation position.

Owing to its simple design, the filter element can be produced economically and simply. It is only necessary to provide four similar projections on two side walls of the filter element, which can be placed for example by ultrasonic welding on for example a fleece-like material for the side walls.

Preferably, the two projections arranged on the respective side wall, in an undeformed initial state of the respective side wall, are at a distance from one another that is many times greater than a distance of each one of the two projections from an edge of the side wall that is near this projection.

The two projections arranged on the same side wall are thus preferably arranged in end regions of the respective side wall. A first one of the two projections is accordingly near a first edge of the side wall, and a second one of the two projections is near a second edge of the side wall, wherein the edges of the side wall are opposite one another in the direction of the distance between the projections. Owing to this edge positioning—or in other words, owing to a distance that is as large as possible—of the projections on the respective side wall, the distance between the two projections arranged on the same side wall can be reduced particularly easily by deforming the side wall.

Preferably, a first one of the two projections arranged on the same side wall has a larger overall dimension than a second one of the two projections arranged on this side wall. With these differently configured projections in respect of their overall dimension, with a corresponding configuration of the link end regions on the housing side, it is possible to ensure that the filter element is assembled or installed in the correct position. Thus, it may be provided that only the projection with the appropriate overall dimension can be inserted in the respective link. In this way, correct and positionally accurate mounting of the filter element in the air filter housing can easily be achieved.

In particular, the projections may be configured as respective pins. Projections of this kind, for example configured as circular cylinders, can be moved with particularly low friction along the respective link on the housing side.

Moreover, pins with different sizes of diameter can be produced very easily in production engineering terms.

It may be provided that a first one of the two projections arranged on the same side wall is closer to a bottom edge of the side wall than a second one of the two projections arranged on this side wall. The two projections arranged on the same side wall may be distanced, in the direction of a height of the side wall, by a different amount from the bottom edge of the side wall. The height of the side wall is preferably parallel to a direction in which air passes through the filter material during operation of the filter element. This arrangement of the projections, at different distances from the bottom edge, may ensure that the filter element can only be inserted in a predetermined orientation to the air filter housing, into a receiving space that is formed in the housing. An additional benefit is a more reliable assembly process of the filter element.

It may in addition be provided that the side walls, which have the projections, have a lower stiffness than the transverse walls that join the side walls of the frame together. When the side walls provided with the projections have lower stiffness than the other walls, the side walls provided with the projections can be deformed elastically particularly easily. However, the other walls with the comparatively greater stiffness on the whole ensure good stability of the frame. The different stiffness of the walls can be provided particularly easily if the side walls provided with the projections have a smaller thickness than the other walls.

The advantages and preferred embodiments described for the filter element according to the invention also apply to the air filter device according to the invention, and vice versa.

Further advantages, features and details of the invention will become clear from the following description of preferred embodiment examples, in conjunction with the drawings. The features and combinations of features presented above in the description and the features and combinations of features presented hereunder in the description of the figures and/or only shown in the figures are applicable not only in the combination stated in each case, but also in other combinations or alone, while remaining within the scope of the invention.

DETAILED DESCRIPTION OF THE DRAWINGS

In the figures, identical or functionally equivalent elements have been given the same reference symbol.

Figure 1:
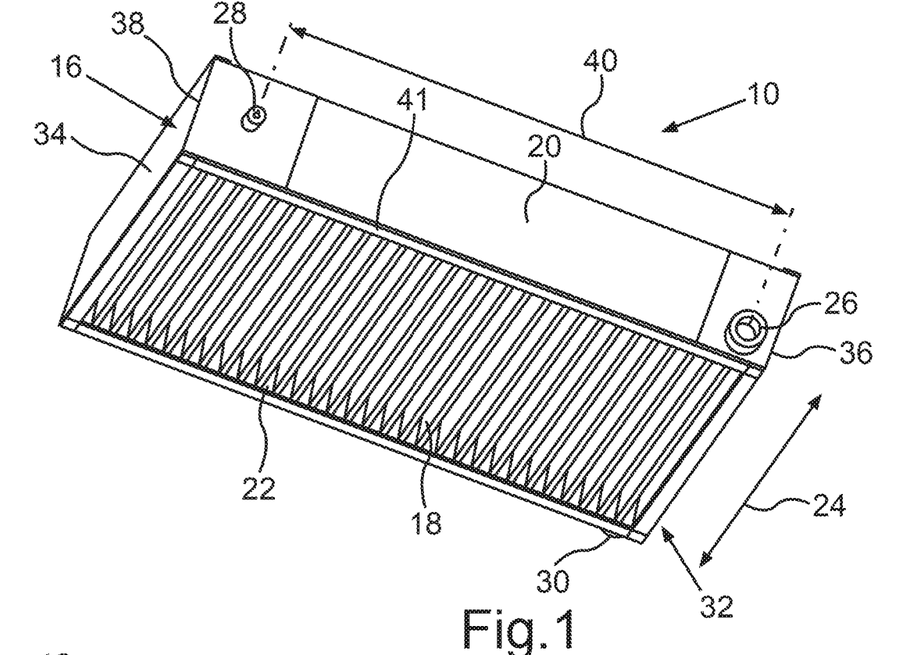
FIG. 1 is a perspective view of a filter element for an air filter device of a motor vehicle.

FIG. 1 shows a schematic perspective view of a filter element 10 for an air filter device of a motor vehicle. The air filter device comprises a housing 12, which is shown schematically and in perspective in FIG. 2. Accordingly, the housing 12 has a receiving space 14, in which the filter element 10 can be inserted.

In the variant of the filter element 10 shown in FIG. 1, the filter element 10 has a frame 16, which surrounds or encloses a filter material 18 completely. In other words, the filter material 18, configured in particular as filter cloth, through which the air to be filtered flows during operation of the air filter device, is held within the frame 16. If, as shown here as an example, the filter element 10 is configured as a pleated filter, the filter material 18 may have corresponding pleating with a plurality of pleats.

In this case the frame 16 comprises a first side wall 20 and a second side wall 22, which is opposite the first side wall 20 in the transverse direction of the filter element 10. The transverse direction is indicated in FIG. 1 with a double-headed arrow 24. On the respective side wall 20, 22, in each case two projections are arranged, which in the variant of the filter element 10 shown in FIG. 1 are configured as retaining pins 26, 28, 30.

FIG. 1 clearly shows a first retaining pin 26, which is arranged on the first side wall 20, and a second retaining pin 28, which is also arranged on the first side wall 20. The two retaining pins 26, 28 project outwards from the first side wall 20 parallel to the transverse direction, which is indicated by the double-headed arrow 24 in FIG. 1. Of the two similarly configured and similarly arranged retaining pins, which are arranged on the opposite second side wall 22 in the transverse direction, only a first retaining pin 30 can be seen partially in FIG. 1.

The retaining pins 26, 28, 30 may be glued to the respective side wall 20, 22 or connected integrally in some other way, for instance by welding, in particular by ultrasonic welding. Moreover, it is possible to configure the retaining pins 26, 28, 30 to be integral with the respective side wall 20, 22.

In the variant of the filter element 10 shown in FIG. 1, the first retaining pin 26 has a larger diameter than the second retaining pin 28. The same applies to the two retaining pins arranged on the second side wall 22, of which only the first retaining pin 30, with the larger diameter, can be seen in FIG. 1.

Here, the frame 16 also comprises two further walls 32, 34, which extend in the transverse direction, and which join the first side wall 20 and the second side wall 22 together.

As can be seen from FIG. 1, the retaining pins 26, 28 formed on the respective side wall 20, 22 are arranged in respective end regions of the side wall 20, 22. In other words the first projection or first retaining pin 26 is near a first edge 36 of the first side wall 20, and the second projection or second retaining pin 28 is near a second edge 38 of the side wall 20, wherein these edges 36, 38 are formed here by opposite corner regions of the frame 16. The corner regions or edges 36, 38 are defined by the meeting point of each side wall 20, 22 with a respective transverse wall 32, 34.

A distance of the respective retaining pin 26, 28 from the edge 36, 38 near this retaining pin 26, 28—or from the corresponding transverse wall 32, 34—is accordingly many times smaller than a distance 40 separating the two retaining pins 26, 28. In other words the distance 40 is many times greater than the distance of the respective retaining pin 26, 28 from the edge 36, 38 near this retaining pin 26, 28.

In the variant of the filter element 10 shown in FIG. 1, the first retaining pin 26 is moreover closer to a bottom edge 41 of the first side wall 20 than the second retaining pin 28. This applies analogously to the retaining pins arranged on the second side wall 22. In the installed state of the filter element 10 in the housing 12 of the air filter device, the bottom edge 41 of the first side wall 20 faces the surroundings 42 of the housing 12, towards which the receiving space 14 is open (cf. FIG. 2).

Figure 2:
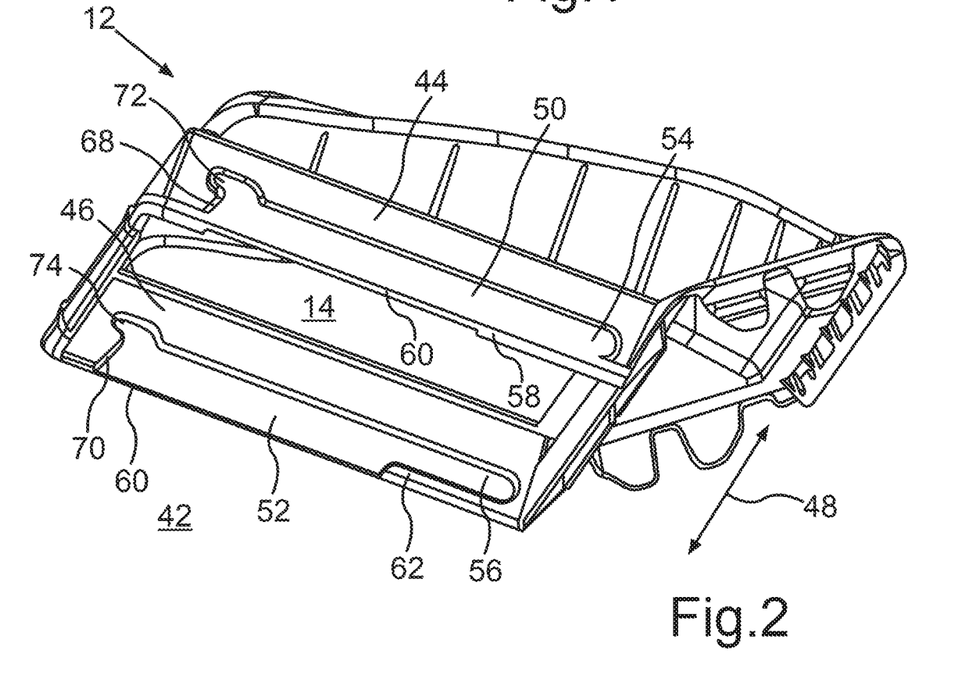
FIG. 2 is a perspective view of a housing of the air filter device, in which the filter element according to FIG. 1 can be inserted or installed.

According to FIG. 2, the housing 12 has a first housing wall—or more precisely housing side wall—44, which is associated with or adjacent to the first side wall 20, when the filter element 10 occupies the receiving space 14 of the housing 12. In particular, the first side wall 20 or optionally a sealing element arranged on the first side wall 20 rests on an inner side of the first housing side wall 44, when the filter element 10 is installed in the housing 12.

Furthermore, the housing 12 has a second housing wall—or more precisely housing side wall—46, which lies opposite the first housing wall 44 in the transverse direction of the housing 12. In FIG. 2, this transverse direction is indicated by a double-headed arrow 48, which is parallel to the double-headed arrow 24 in FIG. 1.

In the first housing wall 44, a first link 50 is formed, only an upper contour of which can be seen in FIG. 2. However, with respect to form, this link 50 is configured exactly like a second link 52, which is formed in the opposite second housing wall 46 of the housing 12. It can be seen in the top view of the inner side of the housing wall 46 that the link 52 is formed as a relief in the otherwise closed wall, the bottom edge 60 of which can be seen.

Figure 3:
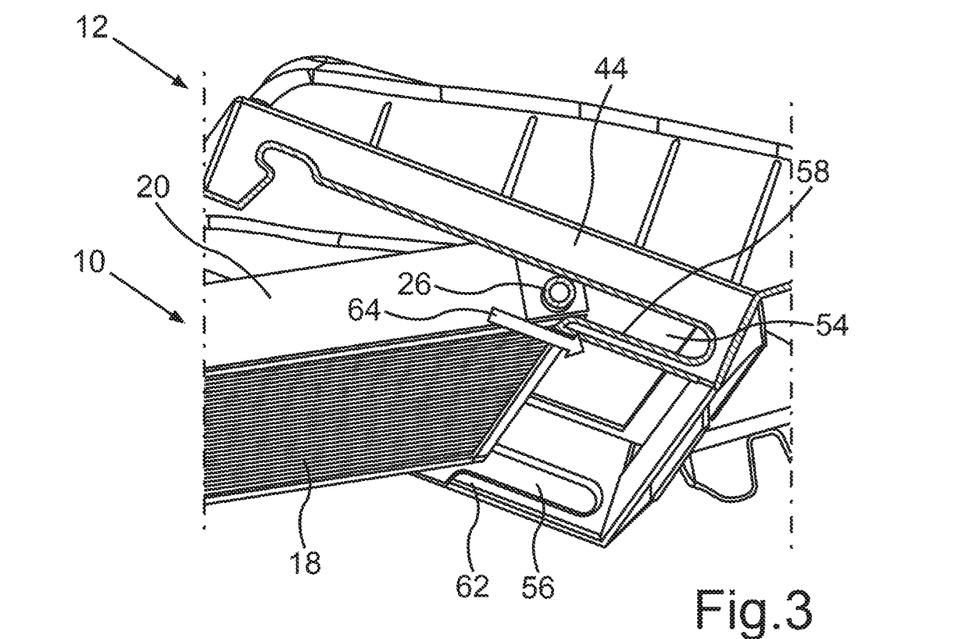
FIG. 3 shows a first step in mounting the filter element according to FIG. 1 in the housing according to FIG. 2.

FIG. 3 shows the contours more clearly, because here the—outwardly closed—housing wall 44 is sectioned so far that the contours of the link 50 made as a relief in the housing wall 44 are clearly discernible in the form of the guide spacer 58 and an end region—or link end region—54.

The first link 50 extends almost over the entire length of the housing side wall 44 and is configured in its opposite link end regions 54, 72 (cf. FIG. 2) for receiving the two retaining pins 26, 28, which are arranged on the first side wall 20 of the filter element 10. Similarly, the second link 52 is configured for receiving the retaining pins arranged on the second side wall 22 in the end regions 56, 74, wherein only the larger retaining pin 30 can be seen in FIG. 1.

It can be seen from FIG. 3 that during insertion of the filter element 10 in the housing 12, first the larger projections or retaining pins 26, 30 are threaded or pushed into a respective end region 54, 56 of the respective link 50, 52. During this insertion, the first retaining pin 26, 30—in the present case, but not necessarily, with a larger diameter than the second retaining pin 28—is in each case guided on a guide spacer 58, 62 of the respective link 50, 52. The upper edge of the guide link 50, 52 extending parallel to the guide spacer 58, 62 forms, over a region of the link 50, 52, a rail on which the projections or retaining pins 26, 30 can be led in a controlled manner.

In this connection, it can be seen from FIG. 2 that this guide spacer 58 extends along a bottom edge 60 of the first housing wall 44 shown in section in FIG. 3. Similarly, the larger-diameter retaining pin 30 of the second side wall 22 rests on a guide spacer 62, which is associated with the second link 52 (cf. FIG. 3). In FIG. 3, an arrow 64 indicates the direction in which the two retaining pins 26, 30 are pushed into the respective end regions 54, 56 of the associated links 50, 52.

The threading of the retaining pins 26, 30 into the rail-like regions of the links 50, 52, required at the start of assembly of the filter element, as well as the further pushing in of the retaining pins 26, 30 along the guide spacers 58, 62 in the link end regions 54, 56 may in the present case advantageously be carried out very well even when the underside of the housing 12, on which the receiving space 14 is formed, cannot be seen or cannot be seen well.

Figure 4:
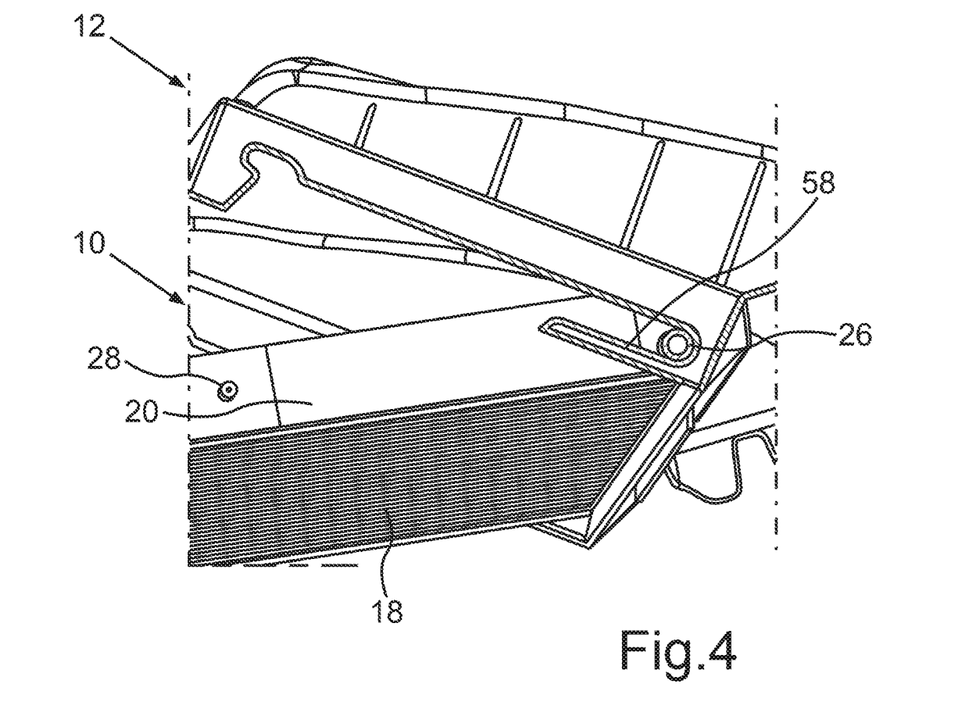
FIG. 4 shows a second step in mounting the filter element according to FIG. 1 in the housing according to FIG. 2.

As illustrated in FIG. 4, the respective retaining pins 26, 30, which are larger here, have reached their final position in the respective link end region or end region 54, 56 of the link 50, 52. In other words the guide pins or retaining pins 26, 30 cannot be pushed farther into the respective end regions 54, 56. As soon as a person carrying out the assembly of the filter element 10 establishes that the final position has been reached, the filter element 10—shown upwards in the figure—is swivelled into the housing 12 or into the receiving space 14. Then the filter element 10, for example on the front transverse wall 34 that is still freely accessible (cf. FIG. 1), is swivelled about a swivel axis, extending parallel to the rear transverse wall 32, which extends through the retaining pins 26, 30 with the larger diameter or is formed by the retaining pins 26, 30.

Figure 5:
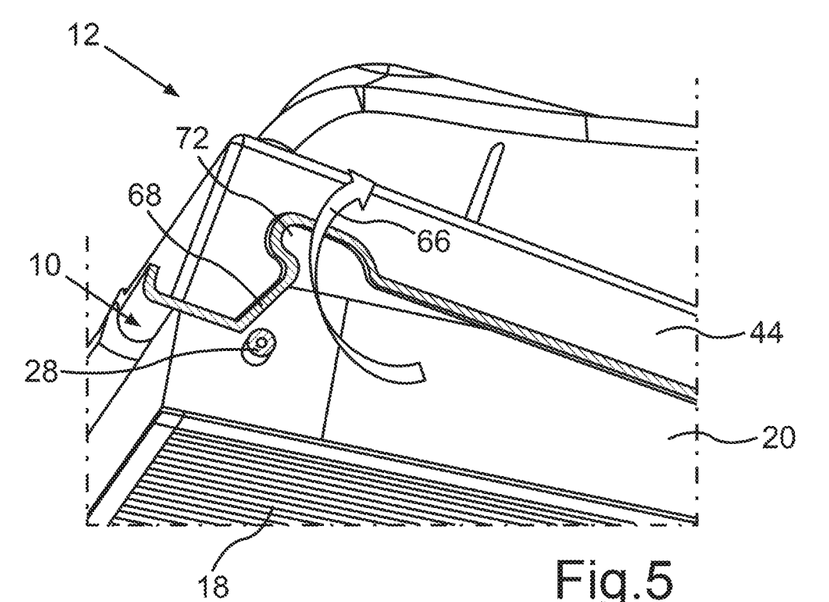
FIG. 5 shows a third step in mounting the filter element according to FIG. 1 in the housing according to FIG. 2.

The corresponding swivelling movement is indicated in FIG. 5 with a further arrow 66. As can also be seen from FIG. 5, through this swivelling of the filter element 10 into the housing 12, the second retaining pin 28 comes up against an obliquely oriented link guide flank—or guide flank for short—68 of the first link 50, which is formed in the first housing wall 44 (cf. FIG. 2).

Similarly, the second link 52, which is formed in the opposite, second housing wall 46, also has an obliquely oriented guide flank 70 (cf. FIG. 2). In this case the small retaining pin (not shown), which is formed on the second side wall 22, comes into contact with this guide flank 70, and projects outwards from this second side wall 22 of the frame 16 parallel to the transverse direction.

If the second retaining pin 28 is pushed along the guide flank 68 formed in the manner of an entering slope—for example by pressing on the front transverse wall 34—towards the housing interior and upwards, this causes compression or elastic deformation of the side wall 20 of the frame 16. The distance 40 between the retaining pins 26, 28 then decreases. Similarly, the opposite second side wall 22 can be compressed or elastically deformed. Accordingly, the distance between the two retaining pins that are arranged on the second housing wall 22 also decreases.

The frame 16 compressed in this way, which holds the filter material 18, springs apart again after reaching an excess pressure point, namely after reaching the point of the respective guide flank 68, 70 projecting farthest inwards— i.e., towards the middle of the corresponding side wall—, on reaching the height of the link end regions 72, 74. In other words the filter element 10 again assumes its initial state shown in FIG. 1, in which the side walls 20, 22 are not elastically deformed. Therefore—as can be seen in FIG. 6—the second retaining pin 28 enters the second end region 72 of the first link 50, which is formed in the first housing wall 44.

This second end region 72 of the first link 50 can only be discerned in FIG. 2 from its contour. However, the second link 52, which is formed in the second housing wall 46, has a corresponding second end region 74. In the respective link end region 72, 74, the respective retaining pin 28, intended for or assigned to it, is thus secured against moving out of the link 50, 52 when the filter element has reached its operating position.

Figure 6:
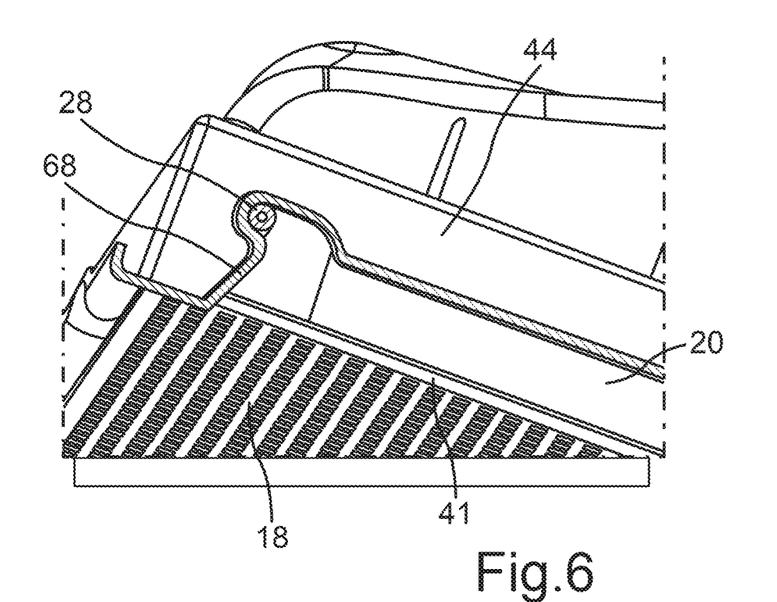
FIG. 6 is a detail of the housing according to FIG. 2 with the filter element according to FIG. 1 placed in its installation position.

This can also be clearly seen from the schematic diagram of a detail of the filter element 10 installed in the air filter device, shown in FIG. 6, which shows the retaining pin 28 arranged on the first side wall 20.

From the installation position or operating position of the filter element 10 in the receiving space 14 of the housing 12, in which the four retaining pins 26, 28, 30 are fixed in the respective link end regions assigned to them—or final positions—54, 56, 72, 74 of the two housing side walls 44, 46 (not shown in FIG. 6), the filter element 10 can only be removed again from the housing 12 by elastic deformation of the respective side walls 20, 22. By manually acting upon the filter material 18, which is connected to the walls 20, 22, 32, 34 of the filter element 10, and by corresponding compression of the filter element 10, the respective retaining pins may be moved out of the end region 72, 74 of the respective link 50, 52 either along the guide slope 68, 70, as is shown in FIG. 5 for the retaining pin 28, or the retaining pins can be pulled out of the end regions 54, 56, 72, 74 by pulling on the filter material 18 orthogonally to the travel of the links 50, 52.

Accordingly, the filter element 10 can be dismantled easily, firstly by moving the respective retaining pin 28 out of the respective end region 72, 74 and then swivelling the filter element 10 downwards. With this swivelling movement of the filter element 10, the respective retaining pin 28 is firstly pressed against the corresponding guide flank 68, 70, until the position of the filter element 10 shown in FIG. 5 is reached. Then the two—here larger—retaining pins 26, 28 can be withdrawn from the other end regions 54, 56 of the associated links 50, 52, against the direction indicated by the arrow 64 in FIG. 3.

Figure 7:
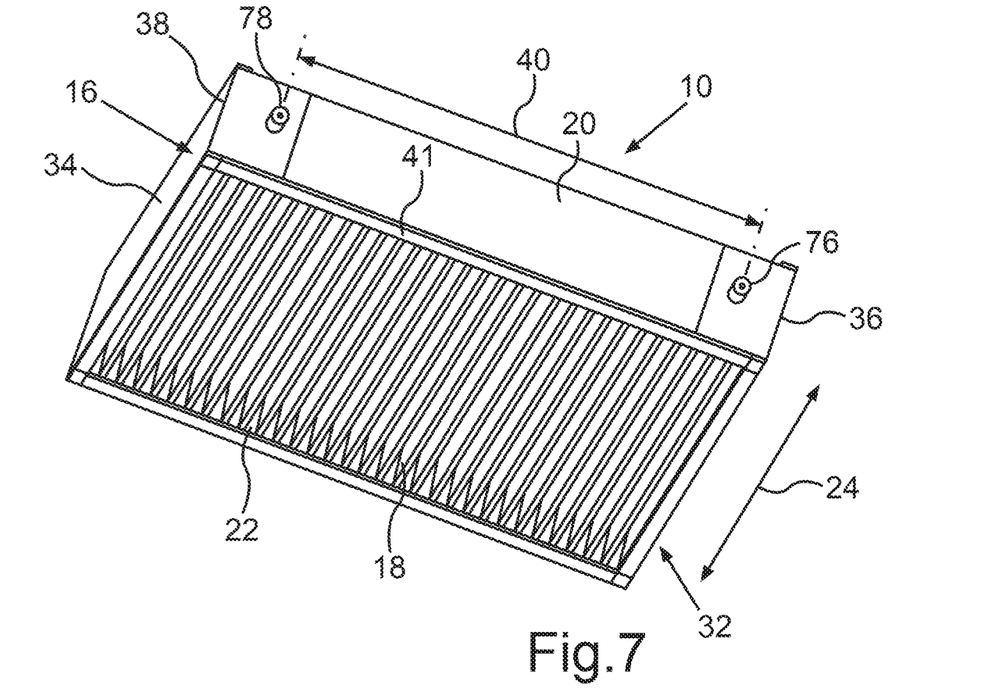
FIG. 7 is a variant of the filter element according to FIG. 1.
Figure 8:
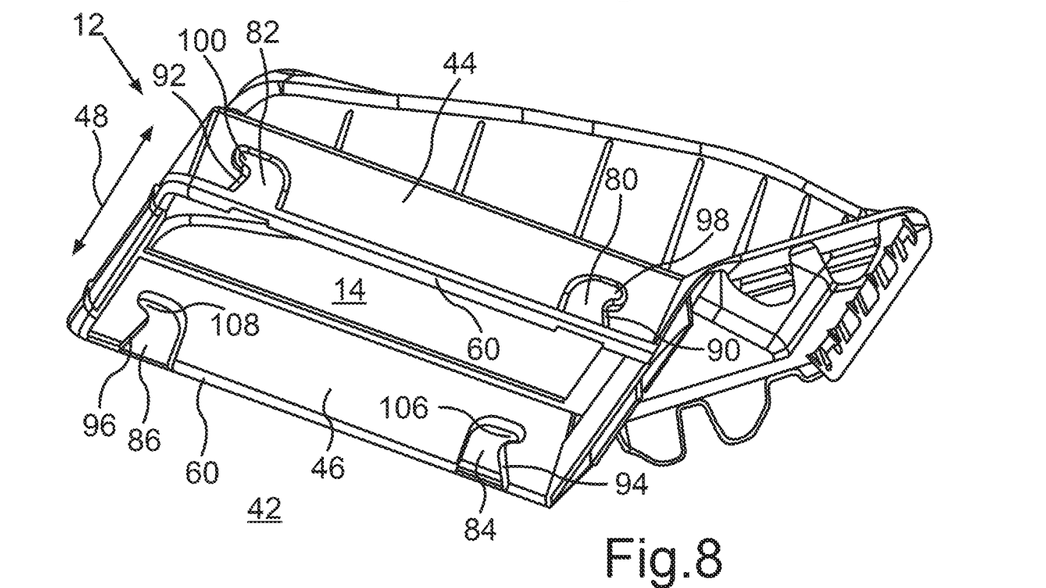
FIG. 8 is a variant of the housing according to FIG. 2.

FIG. 7 is a perspective view of a variant of the filter element 10, which can be installed in a variant of the housing 12, shown in perspective in FIG. 8. Once again, the receiving space 14 for the filter element 10 is formed in the housing 12. Again for the filter element 10 shown in FIG. 7, two projections in the form of a first retaining pin 76 and a second retaining pin 78, projecting outwards parallel to the transverse direction, are arranged on the first side wall 20. The transverse direction is indicated by the double-headed arrow 24.

Like the first side wall 20, the opposite second side wall 22 of the frame 16 in the transverse direction of the first side wall 20 also has two retaining pins (not shown), which also project outwards parallel to the transverse direction of the second side wall 22.

In the variant of the filter element 10 shown in FIG. 7, a distance 40 between the retaining pins 76, 78 can also be reduced by deforming the side wall 20. This applies analogously to the distance between the retaining pins arranged on the second side wall 22. Once again, in this variant the retaining pins 76, 78 may be glued or welded to the respective side wall 20, 22, in particular joined by ultrasonic welding, or formed integrally with the respective side wall 20, 22.

In the variant of the filter element 10 shown in FIG. 7, the retaining pins 76, 78 have the same overall dimensions or equally large diameters, wherein—with corresponding configuration of the link end regions 98, 100 associated with the retaining pins 76, 78—also different dimensions of the retaining pins 76, 78 may be provided, and conversely the embodiments shown in FIGS. 1 to 6 may be configured with equal sizes of retaining pins 26, 28, 30 with suitable link end regions 52, 54, 72, 74.

In the variant of the housing 12 shown in FIG. 8, the opposite housing side walls 44, 46 in each case have two short links 80, 82, 84, 86, which are formed separately in the respective housing wall 44, 46—once again in the manner of a relief. The perspective view in FIG. 8 only shows the external contours of the two links 80, 82, which are provided by the first housing wall 44 or are formed in the first housing wall 44. In shape, however, these links 80, 82 are configured exactly like the two links 84, 86 provided or formed in the second housing wall 46.

Figure 9:
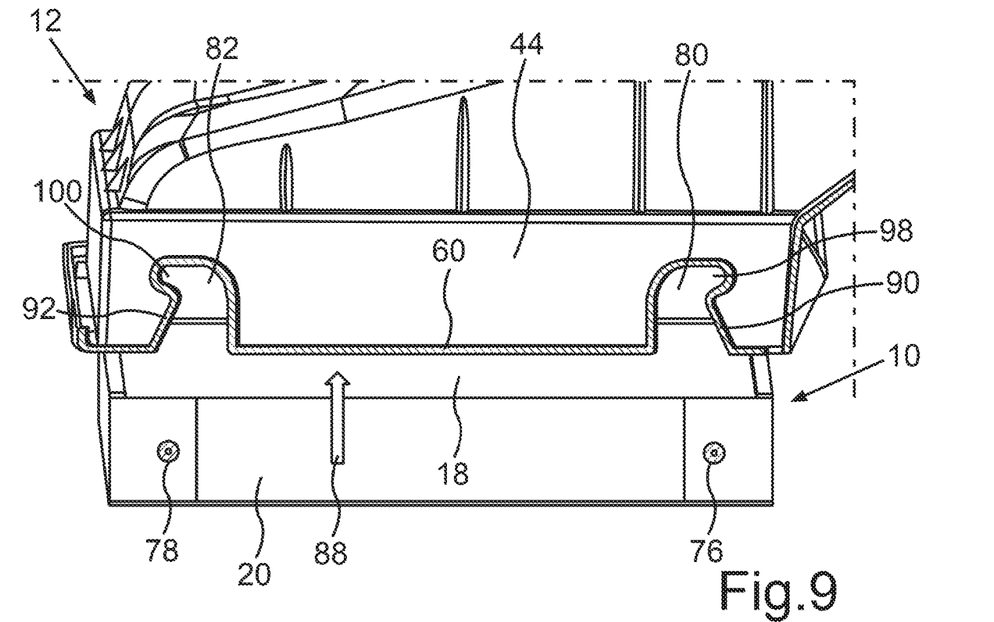
FIG. 9 shows a first step in insertion of the filter element according to FIG. 7 in the housing according to FIG. 8.

According to FIG. 9, installation of the filter element 10 in the receiving space 14 of the housing 12 may also take place substantially as for the embodiment in FIGS. 1 to 6, in that firstly two retaining pins 76 or 78 projecting on opposite side walls 20, 22 are inserted to form a swivel axis in the link end regions 98, 106 or 100, 108 assigned to them, and then the other two retaining pins 78 or 76—as described above— are inserted in the link end regions 100, 108 or 98, 106 assigned to them.

On the other hand, the embodiment shown in FIGS. 9 to 11 also allows insertion of the filter element 10 vertically from below into the receiving space 14, wherein the four retaining pins 76, 78 on the filter element 10 are pushed simultaneously into the link end regions 98, 100, 106, 108 assigned to them. The pushing-in movement is in this case perpendicular to a plane that is spanned by the distance 40 of the retaining pins 76, 78 and the transverse direction indicated by the double-headed arrow 24 in FIG. 7. A corresponding insertion direction is indicated in FIG. 9 by an arrow 88. This inserting of the filter element 10 into the housing 12 can also be carried out easily by one operator, without the underside of the housing 12, thus the side of the receiving space 14 facing the surroundings 42, definitely having to be visible, because owing to the supporting guiding of the retaining pins 76, 78 in the links 80, 82, 84, 86, an intuitive operation is possible, in which all four links 80, 82, 84, 86 are open at the bottom—in a corresponding region of the link relief in the housing side wall 44, 46—for receiving the retaining pins 76, 78, so that haptic feedback is also made possible, as soon as the filter element 10 is correctly oriented for installation.

Figure 10:
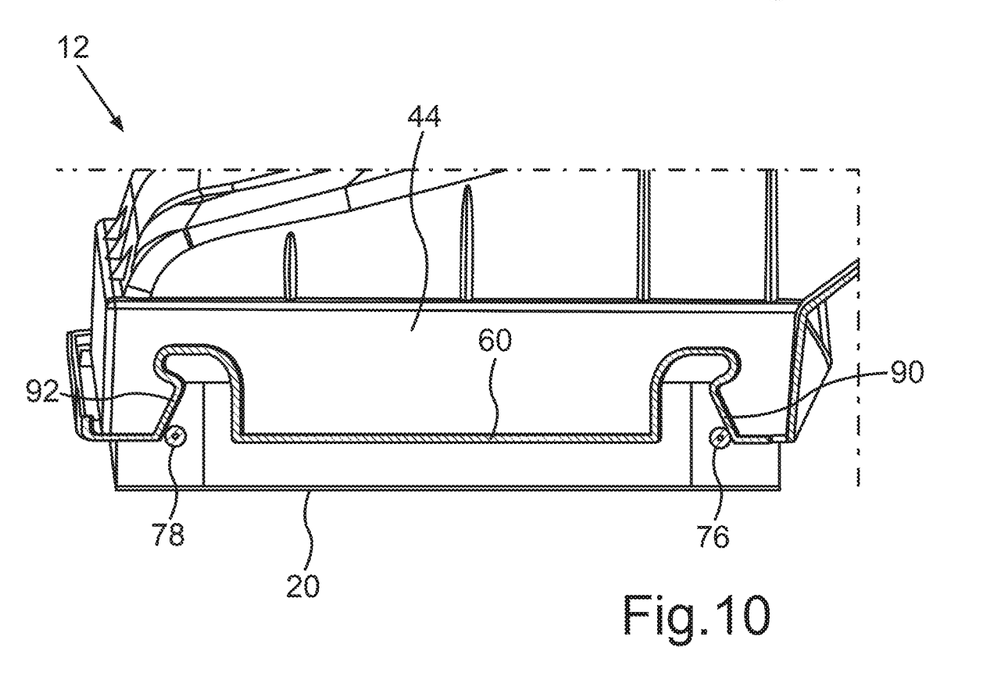
FIG. 10 shows a second step in insertion of the filter element according to FIG. 7 in the housing according to FIG. 8.

According to FIG. 10, as a result of this threading or pushing of the filter element 10 into the housing 12, the two retaining pins 76, 78 come into contact with respective guide flanks 90, 92 configured as guide slopes of the links 80, 82 provided for the retaining pins 76, 78. In FIG. 8, the guide flank 90 for the first link 80 is only discernible from its contour, as the uncut housing wall 44 is shown here, which is closed outwardly, as well as the guide flank 92 of the second link 82, which is provided by the first housing side wall 44.

It can be seen particularly well from the partially sectional representation of the links 80, 82 in FIG. 10 that the two guide flanks 90, 92 are oriented obliquely to one another. Accordingly, a distance of these two link guide flanks 90, 92 from one another in the region of the bottom edge 60 of the first housing wall 44 (cf. FIG. 8) is greater than at a greater distance from this bottom edge 60. This oblique orientation of the two guide flanks 90, 92 to one another has the effect that during insertion of the filter element 10 in the receiving space 14 by pushing upwards, the side wall 20 is deformed elastically. The distance 40 between the two retaining pins 76, 78 is thus reduced.

Similarly, the two links 84, 86 formed in the second housing wall 46 have guide flanks 94, 96 of this kind, configured as entering slopes (cf. FIG. 8). Once again, the guide flank 94 of the first link 84 is oriented obliquely, and so too is the guide flank 96 of the second link 86. The oblique orientation of these two guide flanks 94, 96 to one another has the effect that the projections or retaining pins arranged on the second side wall 22 of the frame 16 (not shown) are moved towards one another during pushing-in of the filter element 10 into the receiving space 14, through elastic deformation of the second side wall 22.

Figure 11:
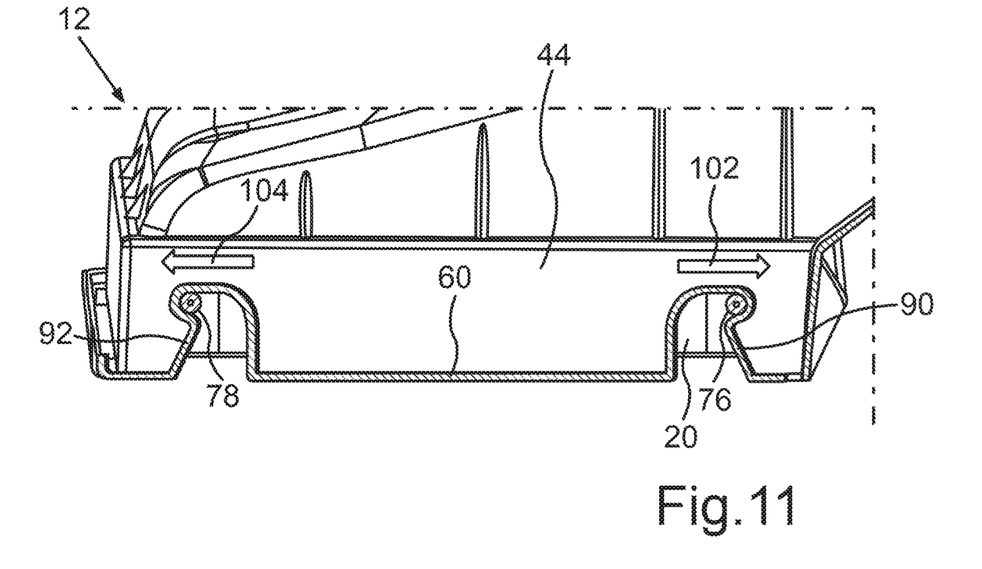
FIG. 11 shows attainment of an installation position of the filter element according to FIG. 7 in the housing according to FIG. 8.

It can be seen from FIG. 11 that after compression of the two opposite side walls 20, 22, the frame 16 returns to its shape shown in FIG. 7 or the initial state shown in FIG. 7. In this case, after the elastic deformation of the respective side wall 20, 22, the first retaining pin 76 enters an end region 98 of the first link 80 (cf. FIG. 9), which is formed in the first housing wall 44.

Similarly, the second retaining pin 78 enters an end region 100 of the second link 82, which is also formed in the first housing wall 44 (cf. FIG. 9). It can be seen that these link end regions 98, 100 extend in opposite directions. The movement of the retaining pins 76, 78 arranged on the same side wall 20 into the end regions 98, 100 is indicated in FIG. 11 by corresponding arrows 102, 104.

Similarly, an end region 106 of the first link 84 formed in the second housing wall 46 extends in a direction that is opposite to the direction in which an end region 100 of the second link 86 formed in the second housing wall 46 extends (cf. FIG. 8). Because the retaining pins arranged on the second side wall 22 (not shown) also enter these end regions 106, 108, the filter element 10 is accommodated reliably in the predetermined installation position in the receiving space 14 of the housing 12.

Both in the variant of the air filter device described with reference to FIG. 1 to FIG. 6 and in the variant presented with reference to FIG. 7 to FIG. 11, the intrinsic elasticity of the filter frame 16, in particular of the opposite side walls 20, 22, is utilized in order to move the projections in particular in the form of the retaining pins 26, 28, 30, 76, 78 into their respective final position in the link end regions 72, 74, 98, 100, 106, 108.

In the variant explained on the basis of FIG. 1 to FIG. 6, the filter element 10 is first pushed obliquely backwards along the links 50, 52 into the final position and then folded into the housing 12 and is then secured in the receiving space 14.

In the variant described with reference to FIG. 7 to FIG. 11, in contrast it is also possible to proceed by inserting the retaining pins 76, 78 of the filter element 10 from below into the respective links 80, 82, 84, 86. After the side walls 20, 22 of the filter element 10 expand again, the retaining pins 76, 78 reach their respective final position in the respective end regions 98, 100, 106, 108. Then the filter element 10 is in its fully functional operating position in the receiving space 14 of the housing 12.

The invention claimed is:

1. An air filter device for a motor vehicle, comprising:
   a housing and a filter element, wherein the housing comprises a receiving space for the filter element, wherein the filter element has a frame which surrounds a filter material of the filter element at least partially, wherein the frame has a first side wall and an opposite second side wall, and wherein the frame has a first transverse wall and an opposite second transverse wall which connect the first and second side walls together;
   wherein a respective first projection projects from each side wall near one of the two transverse walls;
   wherein the housing has two opposite housing side walls, both of which have at least one link each in which the first projection of the respective side wall of the filter element is insertable in a first link end region directed in a first direction;
   wherein a respective second projection projects from the side walls near the other one of the two transverse walls, and the housing side walls each have a second link end region directed opposite to the first direction, into which the second projections are insertable such that the filter element is located in an operating position in the receiving space of the housing;
   wherein the side walls are elastically deformable such that a distance between the two projections arranged on the same side wall can be reduced to bring the second projections, during insertion, onto inwards directed link guide flanks in the second link end region assigned to them.

2. The air filter device according to claim 1, wherein the at least one link of the respective housing side wall has a guide spacer along which the first projection of the corresponding side wall of the filter element can be led during insertion of the filter element into the receiving space in the first link end region of the link and wherein the guide spacer extends along a bottom edge of the respective housing wall.

3. The air filter device according to claim 1, wherein both housing side walls each have two separate links which have guide flanks opposite one another and extending obliquely to one another in the direction of the distance of the projections arranged on the associated side wall of the filter element and wherein the guide flanks are configured to support the elastic deformation of the respective side wall in order to reduce the distance of the two projections during insertion of the filter element in the receiving space.

4. The air filter device according to claim 3, wherein the link end regions of the two links of the respective housing side wall abut directly on the respective link guide flanks and wherein the end regions extend in different directions.

* * * * *